United States Patent
Rol

(10) Patent No.: US 11,716,012 B2
(45) Date of Patent: Aug. 1, 2023

(54) CONTROLLING AN ELECTRONIC SWITCHING UNIT FOR SUPPLYING POWER TO AN INDUCTIVE POWER LOAD

(71) Applicant: Vitesco Technologies GmbH, Regensburg (DE)

(72) Inventor: Baptiste Rol, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/798,372

(22) PCT Filed: Mar. 26, 2021

(86) PCT No.: PCT/EP2021/057876
§ 371 (c)(1),
(2) Date: Aug. 9, 2022

(87) PCT Pub. No.: WO2021/204561
PCT Pub. Date: Oct. 14, 2021

(65) Prior Publication Data
US 2023/0066463 A1    Mar. 2, 2023

(30) Foreign Application Priority Data
Apr. 6, 2020    (FR) .................................... 2003400

(51) Int. Cl.
*H02M 1/32* (2007.01)
*H02M 1/36* (2007.01)
(Continued)

(52) U.S. Cl.
CPC ............. *H02M 1/143* (2013.01); *H02M 1/32* (2013.01); *H02M 1/36* (2013.01); *H02M 7/53871* (2013.01)

(58) Field of Classification Search
CPC .......... H02M 1/32; H02M 1/36; H02M 1/143; H02M 7/42; H02M 7/53871
See application file for complete search history.

(56) References Cited

U.S. PATENT DOCUMENTS 10,700,588 B2    6/2020    Yoscovich et al.
2003/0063481 A1*  4/2003    Kojori ..................... H02M 1/36
                                                  363/49
(Continued)

FOREIGN PATENT DOCUMENTS

EP    2930839 A2    10/2015
JP    S57183273 A    11/1982
(Continued)

OTHER PUBLICATIONS

International Search Report and Written Opinion for International Application No. PCT/EP2021/057876, dated Apr. 30, 2021, with partial translation, 10 pages.

(Continued)

Primary Examiner — Gary L Laxton
(74) Attorney, Agent, or Firm — RatnerPrestia

(57) ABSTRACT

A method for controlling an electronic switching unit for supplying electric power to an inductive power load, includes the following steps: activating an initial filter capacitor by connecting it between the electric power supply of the electronic unit and ground, and deactivating the other capacitors of the bank of filter capacitors; measuring the current flowing through this initial filter capacitor; if this current is above a predetermined nominal current threshold, activating an additional filter capacitor by connecting it between the electric power supply of the electronic unit and ground, in parallel with the initial filter capacitor.

12 Claims, 3 Drawing Sheets

(51) Int. Cl.
H02M 1/14 (2006.01)
H02M 7/5387 (2007.01)

(56) References Cited

U.S. PATENT DOCUMENTS

| | | | |
|---|---|---|---|
| 2013/0094262 | A1 | 4/2013 | Avrutsky |
| 2014/0339918 | A1 | 11/2014 | Perreault et al. |
| 2015/0171763 | A1 | 6/2015 | Kondo et al. |
| 2016/0268797 | A1* | 9/2016 | Li .......................... H02M 1/32 |
| 2021/0218359 | A1* | 7/2021 | Swamy ................ H02M 7/062 |

FOREIGN PATENT DOCUMENTS

| | | |
|---|---|---|
| JP | 3992242 B1 | 10/2007 |
| JP | 2010213510 A | 9/2010 |
| WO | 2016103325 A1 | 6/2016 |
| WO | 2018155073 A | 8/2018 |

OTHER PUBLICATIONS

International Search Report and Written Opinion for International Application No. PCT/EP2021/057876, dated Apr. 30, 2021, 13 pages (French).

English Translation of the Written Opinion for International Application No. PCT/EP2021/057876, dated Apr. 30, 2021, 6 pages.

* cited by examiner

CONTROLLING AN ELECTRONIC SWITCHING UNIT FOR SUPPLYING POWER TO AN INDUCTIVE POWER LOAD

CROSS REFERENCE TO RELATED APPLICATIONS

This application is the U.S. National Phase Application of PCT International Application No. PCT/EP2021/057876, filed Mar. 26, 2021, which claims priority to French Patent Application No. 2003400, filed Apr. 6, 2020, the contents of such applications being incorporated by reference herein.

FIELD OF THE INVENTION

The invention relates to the field of electronic switching circuits supplying power to inductive power loads from an electrical accumulator.

In the automotive industry, for example, inductive power loads, such as electric motors, are regularly employed. These inductive power loads require bridges of switches such as inverters, H-bridges, DC-to-DC converters, etc. to control them. In this type of architecture, an electrical accumulator, for example a battery, thus supplies power to the inductive power load via a switching circuit comprising a bridge of switches.

Inductive power loads comprise coils which generate a high inrush current during certain operating phases. An electric motor, for example, will generate an inrush of current when the motor is started, or during sharp acceleration, which may be very high.

BACKGROUND OF THE INVENTION

Managing large inrush currents relating to the inductive power load requires filter capacitors, generally of electrochemical type, to be added between the electric power supply and the ground of the electronic switching circuits. These capacitors are used to stabilize the voltage bus of the battery each time there is a large inrush of current for the power functions of the electronic switching circuit.

In this context, a large amount of electrical energy flows through the electrochemical capacitors, which are sensitive components having certain specifications and a certain usage range, not complying with which leads to damage to these components. Damage to the electrochemical capacitors may lead to a short circuit between the battery and ground and to the electronic switching unit being destroyed.

The common solution for avoiding these critical consequences is to oversize the installation of electrochemical filter capacitors. Thus, the bank of capacitors which is provided between the electric power supply and ground consists of an oversized number of capacitors, and the capacitance of these capacitors is also oversized. Operating safety is obtained at an extra cost in manufacturing the electronic switching units, as well as additional bulk on the printed circuits of these units, this going against the trend, in particular in the automotive industry, of lowering manufacturing costs and decreasing the size of computers.

Other solutions provide for replacing the electrochemical capacitors with capacitors of other technologies having less risk of failing. These capacitors are more expensive than electrochemical capacitors and these technologies are not as well adapted to the filtering function.

SUMMARY OF THE INVENTION

An aspect of the invention is electronic switching units for supplying electric power to an inductive power load of the prior art.

To this end, an aspect of the invention aims for a method for controlling an electronic switching unit for supplying electric power to an inductive power load, this electronic switching unit comprising:
  an electric power supply connector;
  a bridge of switches which are adapted to be controlled according to a pulse-width modulated signal having a nominal working frequency and a duty cycle;
  a bank of power supply filter capacitors, which are arranged between ground and the electric power supply of the electronic switching unit.

This method comprises the following steps:
  activating an initial filter capacitor by connecting it between the electric power supply of the electronic unit and ground, and deactivating the other capacitors of the bank of filter capacitors;
  measuring the current flowing through this initial filter capacitor;
  if this current is above a predetermined nominal current threshold, activating an additional filter capacitor by connecting it between the electric power supply of the electronic unit and ground, in parallel with the initial filter capacitor.

According to one embodiment, when all the capacitors of the bank of filter capacitors are activated, the method comprises the following steps:
  measuring the current flowing through each of the filter capacitors;
  if these currents are above the predetermined nominal current threshold, increasing the working frequency of the pulse-width modulated signal to a first predetermined protection frequency, which is greater than the nominal working frequency.

According to one embodiment, when the working frequency is equal to the predetermined maximum protection frequency, the method comprises the following steps:
  measuring the current flowing through each of the filter capacitors;
  if these currents are above a predetermined maximum current threshold corresponding to the predetermined maximum protection frequency, decreasing the duty cycle of the pulse-width modulated signal to a predetermined protection value.

The method according to an aspect of the invention makes it possible to protect the electrochemical filter capacitors. This protection may be exploited to size the electrochemical capacitors as accurately as possible for a particular electronic switching unit. Accurately sizing the electrochemical capacitors may reduce the cost thereof. In addition, as the electrochemical capacitors are bulky components, reducing their number and their capacitance allows a substantial gain in terms of bulk on the printed circuit of the electronic unit, and therefore a general reduction in the size of this electronic unit.

Moreover, this protection makes it possible to increase the reliability of the electronic switching unit.

The method according to an aspect of the invention may comprise the following additional features, alone or in combination:
  the method comprises the following steps: measuring the current flowing through each of the activated filter capacitors; if these currents are above the predetermined nominal current threshold, activating an additional filter capacitor by connecting it between the electric power supply of the electronic unit and ground; said steps are repeated until all the capacitors of the bank of filter capacitors are activated;

after a step of measuring the current flowing through each of the activated filter capacitors, if the current flowing through each activated capacitor is below a predetermined floor threshold, deactivating the last activated capacitor;

the predetermined floor threshold is equal to half of the predetermined nominal current threshold;

when all the capacitors of the bank of filter capacitors are activated, the method comprises the following steps: measuring the current flowing through each of the filter capacitors; if these currents are above the predetermined nominal current threshold, increasing the working frequency of the pulse-width modulated signal to a first predetermined protection frequency, which is greater than the nominal working frequency;

the method comprises the following steps: measuring the current flowing through each of the filter capacitors; if these currents are above a first predetermined current threshold corresponding to the first predetermined protection frequency, increasing the working frequency of the pulse-width modulated signal to a second predetermined protection frequency;

the following steps are repeated until the working frequency reaches a predetermined maximum protection frequency: measuring the current flowing through each of the filter capacitors; if these currents are above an Nth predetermined current threshold corresponding to the Nth predetermined protection frequency, increasing the working frequency of the pulse-width modulated signal to an N+1th predetermined protection frequency;

when the working frequency is equal to the N+1th predetermined protection frequency, if the current flowing through each capacitor is below the Nth predetermined current threshold corresponding to the Nth predetermined protection frequency, lowering the working frequency to the value of the Nth predetermined protection frequency;

when the working frequency is equal to the predetermined maximum protection frequency, the method comprises the following steps: measuring the current flowing through each of the filter capacitors; if these currents are above a predetermined maximum current threshold corresponding to the predetermined maximum protection frequency, decreasing the duty cycle of the pulse-width modulated signal to a predetermined protection value;

the preceding steps are repeated while gradually lowering the duty cycle until the current flowing through each of the filter capacitors is below the predetermined maximum current threshold corresponding to the predetermined maximum protection frequency;

each capacitor of the filter capacitor bank is assigned in turn to the function of initial filter capacitor, each time the method starts again.

BRIEF DESCRIPTION OF THE DRAWINGS

Other features and advantages of aspects of the invention will become apparent from the following non-limiting description, with reference to the appended drawings, in which.

DETAILED DESCRIPTION OF THE PREFERRED EMBODIMENTS

Figure 1:
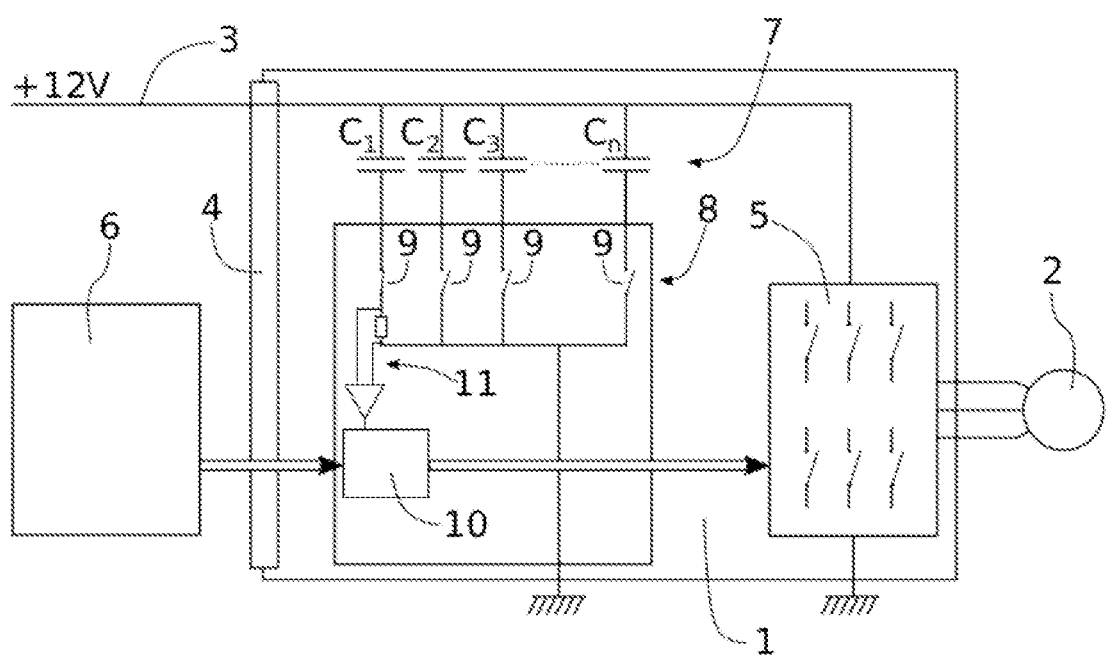
FIG. 1 schematically shows an electronic switching unit according to an aspect of the invention.

FIG. 1 schematically illustrates an electronic switching unit 1 according to an aspect of the invention. In this illustrative example, the electronic unit 1 is an inverter intended to supply power to and control a three-phase electric motor 2 within a motor vehicle. The electronic unit 1 is supplied with power by a battery of the motor vehicle, the power supply line 3 of which, at the potential of +12 V, is shown. The electronic unit 1 comprises an electric power supply connector 4 making it possible in particular to connect the electronic unit 1 to this electric power supply line 3.

The electronic unit 1 comprises a bridge 5 of switches which is adapted, in the present example, to supply power to the three-phase motor 2. A microcontroller 6 forming part of the equipment of the vehicle transmits the control setpoints to be implemented for controlling the motor 2 to the bridge 5 of switches. In this example, the bridge 5 of switches is controlled by a pulse-width modulated (PWM) signal delivered by the microcontroller 6. This pulse-width modulated signal has a working frequency and a duty cycle.

The motor 2 is an inductive power load comprising high-inductance coils, and the electronic unit 1 has a bank 7 of input filter capacitors. This bank 7 of capacitors consists of a predefined number of capacitors $C_1$ to $C_n$ which are high-capacitance (for example, more than 1 μF) electrochemical capacitors. These capacitors $C_1$ to $C_n$ protect the electronic unit 1 against the large variations in electrical energy caused by the high inrushes of current which take place during certain operating phases of the motor 2, such as starting or acceleration.

The capacitors $C_1$ to $C_n$ are intended to be connected between the power supply line 3 (+12 V) and ground. The number of capacitors $C_1$ to $C_n$ is chosen according to the power of the installation. The electronic unit 1 in addition comprises a device 8 for connecting capacitors. This device 8 comprises, for each of the capacitors $C_1$ to $C_n$, a switch 9 making it possible to open or to close the circuit between one electrode of the capacitor and ground, the other electrode of each capacitor being connected to the power supply line 3. Thus, all the capacitors $C_1$ to $C_n$ the switch 9 of which is closed are placed in parallel and are connected between the power supply line 3 and ground (they are said to be "activated"), while the capacitors the switch 9 of which is open are outside the circuit, and are said to be "deactivated".

The device 8 for connecting capacitors is controlled by a control module 10 which is adapted to close and open the switches 9. The switches 9 are, for example, transistors and the module 10 may be a module of driver type.

The control module 10 moreover receives the pulse-width modulated signal from the microcontroller 6. The module 10 thus has the information relating to the working frequency and to the duty cycle given as a setpoint by the microcontroller 6 for controlling the motor 2. The control module 6, however, transfers this signal to the switch bridge 5 in order to effectively control the bridge 5 of switches and therefore control the motor 2, and is able to modify this signal.

The device 8 for connecting capacitors in addition comprises a means for measuring the current flowing through each capacitor $C_1$ to $C_n$, this means being schematically depicted by an ammeter 11. In the schematic figure of FIG. 1, only the ammeter 11 of the capacitor $C_1$ has been shown, it being understood that each capacitor $C_1$ to $C_n$ has such a measuring means. The control module 10 thus has a measurement of the current for each capacitor $C_1$ to $C_n$.

The control method according to an aspect of the invention makes it possible for the bank 7 of capacitors to fulfill its filtering function by protecting the electronic unit 1 from the load inrush current, which may transiently be very high. The method also guarantees optimal operation of the capacitors $C_1$ to $C_n$ and their durability, and consequently improves the general reliability of the electronic unit 1. This method is described with reference to the diagram of FIG. 2, which schematically illustrates the steps successively implemented by the control module 10 controlling the device 8 for connecting capacitors.

A first step A1 relates to the initial programming of the control module 10 when it is brought into operation. During this step A1, the following data are stored in the control module 10:
  the number n of capacitors forming the bank 7 of capacitors;
  the nominal working frequency $F_{T0}$ of the pulse-width modulated signal;
  a predetermined maximum protection frequency $F_{TM}$ of the pulse-width modulated signal;
  predetermined intermediate protection frequencies $F_{T1}$, $F_{T2}$, . . . , between the nominal frequency and the maximum protection frequency of the pulse-width modulated signal;
  the effective current thresholds $I_{RMS\_T0}$, $I_{RMS\_T1}$, $I_{RMS\_T2}$, . . . , $I_{RMS\_TM}$ of the capacitors, corresponding to each of the working frequencies $F_{T0}$, $F_{T1}$, $F_{T2}$, . . . , $F_{TM}$.

The following step A2 then relates to initializing the choice of the initial filter capacitor, which will be the only capacitor activated when the method starts. During the first iteration of the method, the first capacitor $C_1$ is designated as the initial filter capacitor.

During a following step A3, the initial capacitor ($C_1$, in this first iteration of the method) is activated and all the other capacitors $C_2$ to $C_n$ are deactivated. The capacitors are activated or deactivated by the switches 9 (see FIG. 1). Step A3 therefore consists, during this first iteration, in closing the switch 9 relating to the first capacitor $C_1$ and in opening all the other switches 9 relating to the other capacitors $C_2$ to $C_n$.

During a following step A4, the current flowing through the initial capacitor is measured using the ammeter 11 (see FIG. 1). If the current measured through the initial capacitor is above the nominal current threshold $I_{RMS\_T0}$, then the method proceeds to the following step A5. Otherwise, the method loops back to step A4. The value of the nominal current threshold $I_{RMS\_T0}$ is a predetermined value which depends on the filter capacitors used. This value corresponds to the maximum current which a capacitor (here the capacitor $C_1$ in its role as initial filter capacitor) is intended to safely withstand at the nominal working frequency $F_{T0}$. The nominal working frequency $F_{T0}$ is the frequency of the pulse-width modulated signal sent by the microcontroller 6 and which the control module 10 transmits identically to the bridge 5 of switches.

The method therefore remains at step A4 as long as the current flowing through the initial capacitor (which is in this first iteration the capacitor C1, and which is the only active capacitor of the bank of capacitors) remains below the nominal current threshold $I_{RMS\_T0}$.

Proceeding from step A4 to step A5 corresponds to a situation where the current flowing through the initial capacitor $C_1$ is above the nominal current threshold $I_{RMS\_T0}$, and this current is considered too high for the initial capacitor C1. Step A5 consists in activating an additional filter capacitor in the bank 7 of capacitors. Here, the following capacitor $C_2$ will thus be activated in step A5, that is to say that its switch 9 will be closed by the control module 10.

From step A5, the bank 7 of capacitors will therefore consist of two capacitors $C_1$ and $C_2$ in parallel and the current will therefore be distributed over these two capacitors.

The method then proceeds to step A6, in which a new current measurement is carried out. During this step A6, the current flowing through the two activated capacitors $C_1$, $C_2$ is measured for each of these capacitors. In this step A6, if the currents flowing through the two capacitors $C_1$, $C_2$ are each below the nominal current threshold $I_{RMS\_T0}$, the situation is judged acceptable and the bank 7 of capacitors then consisting of the two capacitors $C_1$, $C_2$ fulfills its function without risk of degradation for the capacitors. The device then proceeds to step A7, in which a new check relating to the current takes place.

During step A7, the current values measured for each capacitor $C_1$, $C_2$ (which are therefore below the nominal current threshold $I_{RMS\_T0}$) are in addition evaluated to determine whether these current measurements are furthermore below a floor threshold. In the present example, the floor threshold is equal to half of the nominal current threshold $I_{RMS\_T0}$. If these two current measurements are above the floor threshold, the method loops back to step A6. Conversely, when the current through the two capacitors $C_1$, $C_2$ is below the floor threshold (half of the nominal current threshold $I_{RMS\_T0}$), the method then proceeds to step A8, in which the second capacitor $C_2$ is deactivated. This situation corresponds to returning to a current judged sufficiently low to require only a single capacitor in the bank 7 of filter capacitors.

The following step A9 consists in determining whether or not the power function is completed, that is to say whether the filtering function fulfilled by the bank 7 of capacitors is still required, taking into account the operating phase of the motor 2. If this power function is not completed, the method then loops back to step A4. Conversely, if the power function is completed, the method proceeds to step A10, in which a new initial capacitor will be designated for the next iteration of the method. In this first iteration of the method, the following capacitor $C_2$ is now designated as the initial capacitor. During the next iteration of step A3 and the following steps, it is this capacitor $C_2$ which will begin by forming the bank 7 of filter capacitors alone. The method then loops back, after step A10, to step A3, during which this new initial capacitor $C_2$ will therefore be activated while all the other capacitors will be deactivated, and the method then launches a new iteration of step A3 and the following steps as described above.

With reference again to step A6 of this first iteration, if, during this step, unlike above, the current measured in each capacitor $C_1$, $C_2$ is above the nominal current threshold $I_{RMS\_T0}$, the method then does not continue with step A7, but this time proceeds to step B1, where the following capacitor of the bank 7 of capacitors is activated. In this first iteration, the capacitors $C_1$, $C_2$, $C_3$ are therefore activated in step B1 while all the other capacitors are deactivated.

The method then proceeds to steps B2 and B3, which are similar to steps A6 and A7, but which this time involve the three capacitors $C_1$, $C_2$, $C_3$.

In step B2, the current flowing through each of the capacitors $C_1$ to $C_3$ is measured and compared with the nominal current threshold $I_{RMS\_T0}$. If this current through each capacitor is below the nominal current threshold $I_{RMS\_T0}$, the method proceeds to step B3, in which this current value is compared with the floor current threshold (here, also, half of the nominal threshold current $I_{RMS\_T0}$). Step B3 loops back to step B2 if the current through each capacitor is above the floor current threshold. Conversely, the method proceeds to step B4 if the current through each capacitor is below the floor current threshold. In step B4, the capacitor which has just been activated ($C_3$) is then deactivated.

The following step B5 consists in determining whether or not the power function is completed. If this power function is not completed, the method then loops back to step A6. Conversely, if the power function is completed, the method proceeds to step B6, in which a new initial capacitor will be designated for the next iteration of the method. In this first iteration of the method, the following capacitor $C_2$ is now designated as the initial capacitor. The method then loops back, after step B6, to step A3, during which this new initial capacitor $C_2$ will therefore be activated while all the other capacitors will be deactivated, and the method then launches a new iteration of step A3 and the following steps as described above.

If, in step B2, the current measured through each of the capacitors $C_1$, $C_2$, $C_3$ is above the nominal current threshold $I_{RMS\_T0}$, the method proceeds to step C1, in which an additional capacitor is activated. The following capacitor is then activated and is added to the capacitors $C_1$, $C_2$, $C_3$ to form the bank 7 of filter capacitors. The method is thus repeated for each of the capacitors of the bank of capacitors (this being schematically depicted by the dotted line 13 in this FIG. 2), so that, as long as the current through each capacitor is above the nominal current threshold $I_{RMS\_T0}$, a new capacitor is added to the bank 7, up to the last capacitor $C_n$.

Step C1 relates to adding this capacitor $C_n$ and thus consists in activating the last capacitor $C_n$ which is available within the bank 7 of filter capacitors.

Steps C1 to C6 then unfold in the same way as steps B1 to B6. After step C1, step C2 therefore relates to comparing the current flowing through each capacitor (all the capacitors $C_1$ to $C_n$ being activated) with the nominal current threshold $I_{RMS\_T0}$. In step C2, the current flowing through each of the capacitors $C_1$ to Cn is measured and compared with the nominal current threshold $I_{RMS\_T0}$. If this current through each capacitor is below the nominal current threshold $I_{RMS\_T0}$, the method proceeds to step C3, in which this current value is compared with the floor current threshold (here, also, half of the nominal threshold current $I_{RMS\_T0}$). Step C3 loops back to step C2 if the current through each capacitor is above the floor current threshold. Conversely, the method proceeds to step C4 if the current through each capacitor is below the floor current threshold. In step C4, the capacitor which has just been activated ($C_n$) is then deactivated.

The following step C5 consists in determining whether or not the power function is completed. If this power function is not completed, the method then loops back to step B2, in accordance with the dotted line 16 (if the capacitor Cn is the fourth and last capacitor of the bank of filter capacitors) or to the step which is equivalent to step B2 for the capacitor which precedes $C_n$. Conversely, if the power function is completed, the method proceeds to step C6, in which a new initial capacitor will be designated for the next iteration of the method.

The method is thus looped back between steps A3 and C6, so that the number of capacitors used within the bank of capacitors is always optimal.

In addition, the method always starts on a single capacitor but, by virtue of steps A10, B6 and C6, this capacitor is rotating, that is to say that each capacitor $C_1$ to $C_n$ will therefore in turn play the role of first capacitor to be activated within the bank of capacitors. This arrangement allows regular wear of the capacitors by balancing the usage times of all the capacitors, whatever their position within the bank of capacitors. The capacitors are activated in a rotating fixed order.

Moreover, during step C2, if the measurements of current flowing through each capacitor $C_1$ to $C_n$ are above the nominal current threshold $I_{RMS\_T0}$, the method then proceeds to a step D1 in which the working frequency of the pulse-width modulated signal will be modified. This situation corresponds to detecting overuse of the capacitors at the initially intended working frequency $F_{T0}$. In other words, although all the capacitors of the bank of capacitors have been activated, it is judged necessary to take an additional measure because, despite the maximum capacitance of the bank of capacitors being used, the current flowing through these capacitors is despite everything above the nominal current threshold $I_{RMS\_T0}$.

During step D1, the working frequency of the pulse-width modulated signal is increased to a first protection frequency $F_{T1}$. The frequency of the pulse-width modulated signal may be modified at the control module 10 or directly at the microcontroller 6. As the first protection frequency $F_{T1}$ is greater than the working frequency $F_{T0}$, the capacitors $C_1$ to $C_n$ of the bank of capacitors therefore accept a larger current, taking into account the specifications which are specific to electrochemical capacitors (see FIG. 3). By virtue of modifying the working frequency to the value $F_{T0}$, a current which is above the nominal current threshold $I_{RMS\_T0}$ no longer poses a risk to the filter capacitors. At this new frequency $F_{T0}$, the current threshold posing a risk to the bank of filter capacitors is now the first predetermined current threshold $I_{RMS\_T1}$ (which is therefore above $I_{RMS\_T0}$), see FIG. 3.

Figure 2:
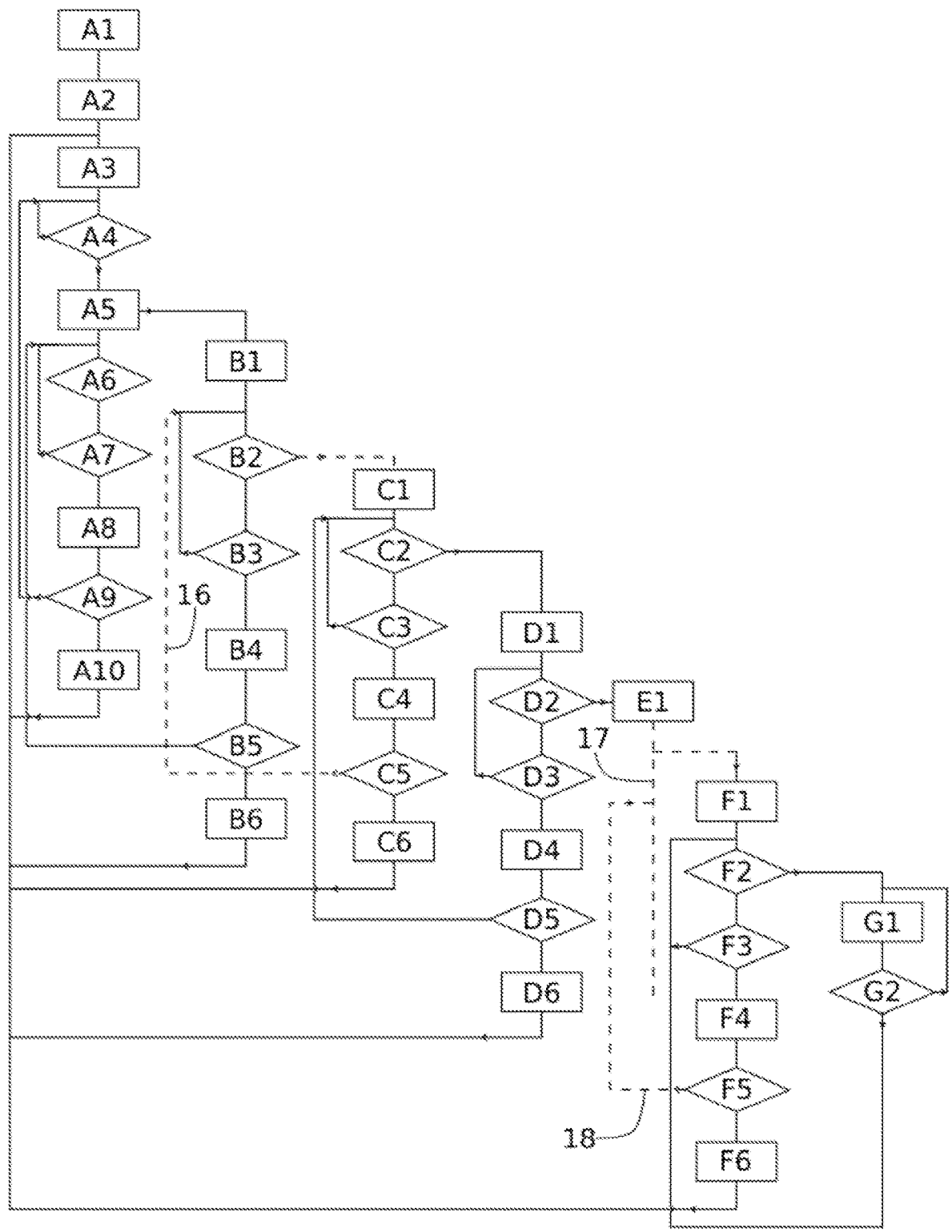
FIG. 2 is a diagram illustrating the method according to an aspect of the invention.

In FIG. 2, step D2 then consists in determining whether the current flowing through each of the capacitors $C_1$ to $C_n$ is above this first predetermined current threshold $I_{RMS\_T1}$. If this is not the case, the method proceeds to step D3, in which the current flowing through each of the capacitors $C_1$ to $C_n$ is this time compared with the nominal current threshold $I_{RMS\_T0}$. If, during step D3, this current is still above $I_{RMS\_T0}$, the method loops back to step D2. Conversely, if, in step D3, the current measured through the capacitors is now below $I_{RMS\_T0}$, the method proceeds to step D4, in which the working frequency is again brought back to the initial working frequency $F_{T0}$. This situation corresponds to the case where increasing the working frequency is no longer judged useful and the method then proceeds to step D5.

The following step D5 consists, similarly to steps A9, B5 and C5, in determining whether the power function is completed. If this power function is not completed, the method then loops back to step C2. Conversely, if the power function is completed, the method proceeds to step D6, in which a new initial capacitor will be designated for the next iteration of the method ($C_2$ is now designated as the initial capacitor, in this first iteration).

With reference again to step D2, if, conversely, the measurement of current through each capacitor $C_1$ to $C_n$ indicates that each of these currents is above the first predetermined current threshold $I_{RMS\_T1}$, the method then proceeds to a step E1 in which the working frequency will this time be increased to a second protection frequency $F_{T2}$. In the same way as for steps D1 to D6, this portion of the method starting at step E1 will then increase the working frequency to the new frequency $F_{T2}$, which is greater than $F_{T1}$ and which thus makes it possible to further increase the capacity of the bank of capacitors $C_1$ to $C_n$, all the capacitors of which are activated here. Following step E1, the sequence is the same as for steps D1 to D6 and is therefore not described in more detail here (this method portion is schematically depicted by the dotted line 17).

This same pattern is repeated for as many frequencies $F_{T1}$, $F_{T2}$, etc. as were anticipated when the method was initialized in step A1. Thus, in summary, when all the capacitors of the bank of capacitors are activated, and the current flowing through the capacitors is still above the nominal current threshold, the working frequency is increased in stages to $F_{T1}$, then to $F_{T2}$, etc. The working frequency is thus increased in stages gradually as long as the current through the capacitors remains beyond a first predetermined current threshold $I_{RMS\_T1}$, a second predetermined current threshold $I_{RMS\_T2}$, etc., respectively, these thresholds corresponding to each of the predetermined frequency stages $F_{T1}$, $F_{T2}$, etc.

This gradation in the increase in the working frequency of the pulse-width modulated signal ends with a maximum frequency $F_{TM}$ also defined during the initialization step A1. Thus, the method proceeds to step F1 when the last frequency stage has been reached and the current through the capacitors is still above the predetermined current threshold corresponding to this last frequency stage. The method then proceeds to a final increase in the working frequency to the maximum frequency $F_{TM}$ (in step F1) so as to implement the maximum capacity of the bank of capacitors for this maximum protection frequency $F_{TM}$.

Step F1 and the following steps unfold in the same way as step D1 and the following steps or step E1 and the following steps (which are not shown). Step F2 then consists in determining whether the current flowing through each of the capacitors $C_1$ to $C_n$ is above the last current threshold $I_{RMS\_TM}$. If this is not the case, the method proceeds to step F3, in which the current flowing through each of the capacitors $C_1$ to $C_n$ is this time compared with the current threshold corresponding to the frequency applied just before the maximum frequency $F_{TM}$ (in this example, this is the frequency applied during step E1 and the following steps). If, during step F3, this current is still above the current threshold corresponding to the frequency applied just before the maximum frequency $F_{TM}$, the method loops back to step F2. Conversely, if in step F3 the current measured through the capacitors is now below the current threshold corresponding to the frequency applied just before the maximum frequency $F_{TM}$, the method proceeds to step F4, in which the working frequency is again brought back to the frequency applied just before (in this example, during step E1 and the following steps). This situation corresponds to the case where increasing the working frequency is no longer judged useful and the method then proceeds to step F5.

The following step F5 consists, similarly to steps A9, B5, C5 and D5, in determining whether the power function is completed. If this power function is not completed, the method then loops back to the method portion of step E1 and the following steps (dotted line 18). Conversely, if the power function is completed, the method proceeds to step F6, in which a new initial capacitor will be designated for the next iteration of the method (as before, $C_2$ is then designated as the initial capacitor, in this first iteration).

Between step A3 and step F6, the bank of filter capacitors is implemented while being protected from current peaks without interfering with the operation of the electronic switching unit.

In addition, in step F2, if the measurement of current through each capacitor indicates that this current is above the last predetermined current threshold $I_{RMS\_TM}$, which corresponds to the maximum admissible current at the maximum protection frequency $F_{TM}$, then the method proceeds to step G1, in which a new measure will be implemented for protecting the capacitor bank. This measure relates to lowering the duty cycle of the pulse-width modulated signal. The method then here enters a degraded mode in which the duty cycle is lowered and thus affects the operation of the controlled capacitive load with the aim of protecting the bank of filter capacitors.

In step G1, the duty cycle is thus lowered by a predetermined value, and, in step G2, it is checked whether the measurement of current through each of the capacitors $C_1$ to $C_n$ has returned to below the last predetermined current threshold $I_{RMS\_TM}$. If this is indeed the case, the method loops back to step F2, and, if this is not the case, the method loops back to step G1 in order to lower the duty cycle again.

The duty cycle of the pulse-width modulated signal is thus lowered, in one or more iterations of step G1, until the current flowing through the capacitors returns to below the last predetermined current threshold $I_{RMS\_TM}$. During this iteration of steps G1 and G2, an alert flag may be activated by the control module 10 in order to warn other equipment of the vehicle, or the user, of a limitation in the control of the motor 2 with a view to protecting the capacitors of the capacitor bank 7. However, an exceptional anomaly aside, these phases of limiting the duty cycle have a short duration and ultimately have little influence on the overall operation of the motor 2.

Figure 3:
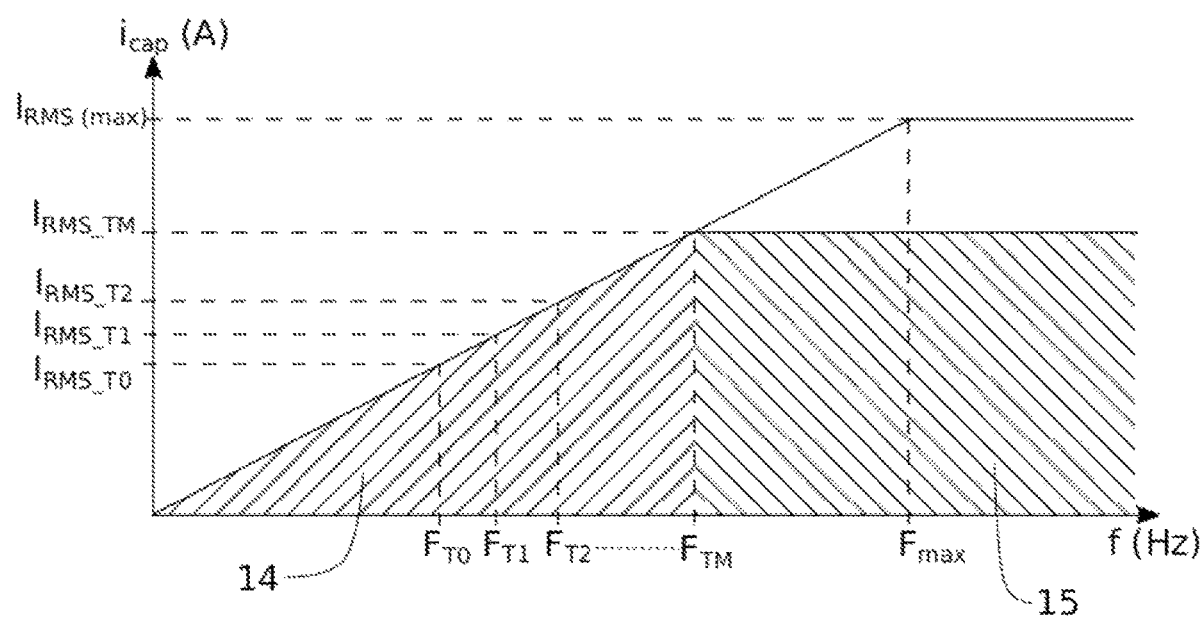
FIG. 3 shows an operating curve of a filter capacitor of the electronic unit of FIG. 1.

The curve of FIG. 3 shows the change in the capacity $i_{cap}$ of a capacitor of the bank of filter capacitors, that is to say the current which may be admitted by the capacitor, as a function of its working frequency f. This curve is valid for a given temperature, here 25° C., and for a defined voltage. The working frequency is the frequency of the pulse-width modulated signal controlling the switch bridge 5. FIG. 3 illustrates the context in which the various working frequencies of the pulse-width modulated signal change, and the associated currents within a capacitor of the bank 7 of capacitors. FIG. 3 results from a characteristic curve of an electrochemical capacitor used in the present example.

FIG. 3, which is characteristic of an electrochemical capacitor, has a rectilinear first portion having a positive gradient which relates to a phase where the increase in the working frequency applied to the capacitor goes together with an increase in its capacity, that is to say in the current which it is capable of withstanding. This rectilinear first portion is bounded by the maximum frequency $F_{max}$ which may be admitted by the capacitor. The frequency $F_{max}$ is the frequency beyond which the capacitor may be destroyed.

FIG. 3 in addition depicts the frequencies $F_{T0}$, $F_{T1}$, $F_{T2}$, ... $F_{TM}$ which are chosen and initialized in the method which has just been described. The frequency $F_{TM}$ is the maximum frequency to which the capacitor will be subjected during the method. This frequency $F_{TM}$ is preferably less than $F_{max}$ to guarantee the durability of the capacitor.

As described above, the method starts with a pulse-width modulated signal at the working frequency $F_{T0}$ corresponding to a maximum current threshold $I_{RMS\_T0}$ for the capacitor. According to the method described, each time the effective current through the capacitor exceeds this value $I_{RMS\_T0}$, a new capacitor is activated within the bank 7 of capacitors. When the last capacitor of the bank 7 of capacitors has been activated, and the current is still greater than the value $I_{RMS\_T0}$, the working frequency is then modified and is increased to the value $F_{T1}$ corresponding to a new maximum current $I_{RMS\_T1}$ flowing through the capacitor. This operation of increasing the working frequency is repeated by successively increasing the frequency to the predetermined frequency stages $F_{T1}$, $F_{T2}$ . . . each time the current through the capacitor exceeds the corresponding current threshold $I_{RMS\_T1}$, $I_{RMS\_T2}$ . . . up to the maximum protection frequency $F_{TM}$ corresponding to a current threshold $I_{RMS\_TM}$. The current through the bank 7 of capacitors therefore changes in the hatched range 14. In this range, the bank of capacitors is protected and the electronic switching unit 1 operates normally, without affecting the operation of the motor 2.

From steps G1 and G2 of the method, when the duty cycle is limited, the current of the capacitor then changes in the second hatched range 15.

Variant embodiments may be implemented without departing from the scope of the invention. In particular, the number of predetermined current thresholds $I_{RMS\_T0}$, $I_{RMS\_T1}$, $I_{RMS\_T2}$ . . . $I_{RMS\_TM}$ may be adapted for a particular application and specific capacitors, as well as the corresponding working frequency $F_{T0}$, $F_{T1}$, $F_{T2}$ . . . $F_{TM}$.

In addition, in relation to steps G1 and G2, the duty cycle may be lowered continuously or in stages.

The invention claimed is:

1. A method for controlling an electronic switching unit for supplying electric power to an inductive power load, the electronic switching unit comprising:
   an electric power supply connector;
   a bridge of switches which are adapted to be controlled according to a pulse-width modulated signal having a nominal working frequency and a duty cycle;
   a bank of power supply filter capacitors, which are arranged between ground and an electric power supply of the electronic switching unit;
   the method comprising:
   activating an initial filter capacitor of the bank of filter capacitors by connecting it between the electric power supply of the electronic unit and ground, and deactivating remaining capacitors of the bank of filter capacitors;
   measuring a current flowing through the initial filter capacitor;
   if the current is above a predetermined nominal current threshold, activating an additional filter capacitor by connecting it between the electric power supply of the electronic unit and ground, in parallel with the initial filter capacitor.

2. The method as claimed in claim 1, further comprising:
   a) measuring a current flowing through each of the filter capacitors of the bank of filter capacitors that are activated;
   b) if the currents flowing through each of the activated filter capacitors are above the predetermined nominal current threshold, activating a further filter capacitor of the bank of filter capacitors by connecting it between the electric power supply of the electronic unit and ground.

3. The method as claimed in claim 2, wherein a) and b) are repeated until all the capacitors of the bank of filter capacitors are activated.

4. The method as claimed in claim 1, wherein, after a step of measuring the current flowing through each of the activated filter capacitors, if the current flowing through each activated capacitor is below a predetermined floor threshold, deactivating a last capacitor of the activated capacitors.

5. The method as claimed in claim 4, wherein the predetermined floor threshold is equal to half of the predetermined nominal current threshold.

6. The method as claimed in claim 3, wherein, when all the capacitors of the bank of filter capacitors are activated, the method further comprises:
   measuring the current flowing through each of the filter capacitors;
   if the measured currents are above the predetermined nominal current threshold, increasing the working frequency of the pulse-width modulated signal to a first predetermined protection frequency, which is greater than the nominal working frequency.

7. The method as claimed in claim 6, wherein the method further comprises:
   measuring the current flowing through each of the filter capacitors;
   if the measured currents are above a first predetermined current threshold corresponding to the first predetermined protection frequency, increasing the working frequency of the pulse-width modulated signal to a second predetermined protection frequency.

8. The method as claimed in claim 7, wherein the following steps are repeated until the working frequency reaches a predetermined maximum protection frequency:
   measuring the current flowing through each of the filter capacitors;
   if these currents are above a further predetermined current threshold corresponding to a respective predetermined protection frequency, increasing the working frequency of the pulse-width modulated signal to yet a further predetermined protection frequency.

9. The method as claimed in claim 8, wherein, when the working frequency is equal to the $N+1^{th}$ predetermined protection frequency, if the current flowing through each capacitor is below the $N^{th}$ predetermined current threshold corresponding to the $N^{th}$ predetermined protection frequency, lowering the working frequency to the value of the $N^{th}$ predetermined protection frequency.

10. The method as claimed in claim 8, wherein, when the working frequency is equal to the predetermined maximum protection frequency, the method further comprises:
    c) measuring the current flowing through each of the filter capacitors; and
    d) if the measured currents are above a predetermined maximum current threshold corresponding to the predetermined maximum protection frequency, decreasing the duty cycle of the pulse-width modulated signal to a predetermined protection value.

11. The method as claimed in claim 10, wherein c) and d) are repeated while gradually lowering the duty cycle until the current flowing through each of the filter capacitors is below the predetermined maximum current threshold corresponding to the predetermined maximum protection frequency.

12. The method as claimed in claim 1, wherein each capacitor of the filter capacitor bank is assigned in turn to the function of initial filter capacitor, each time the method is subsequently repeated.

* * * * *